J. W. DEVLING.
LIME-KILN.

No. 186,233.    Patented Jan. 16, 1877.

Witnesses
And. G. Dietrich
W. E. Chaffee

Inventor.
J. W. Devling
by Daniel Breed
Atty.

UNITED STATES PATENT OFFICE.

JAMES W. DEVLING, OF FLEMINGTON, ASSIGNOR TO GEORGE W. BATCHELER AND JOSEPH B. FURST, OF LOCK HAVEN, PA.

IMPROVEMENT IN LIMEKILNS.

Specification forming part of Letters Patent No. 186,233, dated January 16, 1877; application filed October 3, 1876.

*To all whom it may concern:*

Be it known that I, JAMES W. DEVLING, of Flemington, in the county of Clinton and State of Pennsylvania, have invented certain new and useful Improvements in Limekilns and Ore-Roasters; and I do hereby declare that the following is a full, clear, and exact description thereof, which will enable others skilled in the art to which it appertains to make and use the same, reference being had to the accompanying drawings, and to the letters of reference marked thereon, which form a part of this specification.

Figure 1:
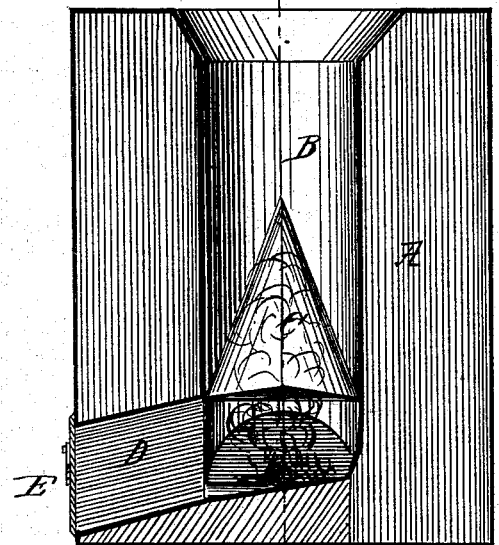
Figure 2:
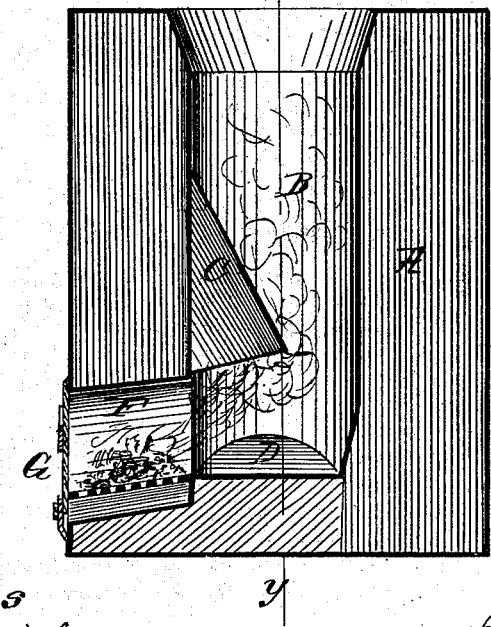

In the accompanying drawings, Figure 1 is a vertical section of my improved limekiln and ore-roaster on the line $y\,y$, Fig. 2. Fig. 2 is a vertical section of the same on the line $x\,x$, Fig. 1.

My invention or improvement in limekilns and ore-roasters consists chiefly of a novel deflector for directing the flame and heat into the center of the lime-chamber at the bottom of the same; and it further consists of features which will be fully understood by the following description:

In the construction of my improved limekiln and oar-roaster, the walls A, Fig. 1, may be made of masonry in the usual manner, care being taken to use good materials.

The furnace or fire chamber is represented at F, Fig. 2, and has the usual doors G, provided with a smaller door or damper, to regulate the draft.

This furnace may be arranged for the use of either wood or coal, as may be desired.

On another face or side of the furnace is the lime discharge passage D, provided with a door, E, as seen in Fig. 1.

In the lime-chamber B, and opposite the fire chamber F, the inner face of the wall has a point or projection, C, extending to or nearly to the bottom center of the fire-chamber B, as shown in Fig. 2. This inward projection C is made of solid masonry of fire-brick, or like the other face-wall, and it directs the flame and current of heat slightly upward and inward to the bottom center of the chamber B, and thus heats the mass of lime at the bottom nearly equally on all sides, and completes the process of burning at the same time throughout the mass.

The drawing arrangement, or discharge-passage for drawing off the lime, has an inclined bottom or floor corresponding to the also inclined floor or bottom of the chamber B, as seen in Fig. 1. This inclined floor facilitates the discharge or drawing of the lime from the kiln, and is a great advantage.

Other details need not be described, as they will be understood by persons skilled in the art.

Having thus described my invention, I claim—

A limekiln or ore-roaster, having the point or inwardly-projecting wall C for the purpose of directing the flame and current of heat to the bottom center of the chamber B, substantially in the manner and for the purposes set forth.

In testimony that I claim the foregoing as my own I affix my signature in presence of two witnesses.

JAMES W. DEVLING.

Witnesses:
W. M. EVERHERT,
W. A. WHITE.